United States Patent [19]

Thuring et al.

[11] Patent Number: 4,749,349
[45] Date of Patent: Jun. 7, 1988

[54] GRANULATING DEVICE AND PLANT

[75] Inventors: Paul Thuring; Jean Sombret, both of Beauvais; Edmond Vogel, Vaucresson, all of France

[73] Assignee: Kaltenbach-Thuring S.A., Beauvais, France

[21] Appl. No.: 804,866

[22] Filed: Dec. 5, 1985

[30] Foreign Application Priority Data

Aug. 7, 1985 [FR] France ............................... 85 12082

[51] Int. Cl.[4] .............................................. B22F 3/00
[52] U.S. Cl. ...................................... 425/222; 118/59; 118/69; 118/303
[58] Field of Search ................. 241/65, 171, 176, 177, 241/178, 181; 264/5, 7, 14, 117; 118/52, 59, 303, 69; 425/222; 427/212, 242, 425

[56] References Cited

U.S. PATENT DOCUMENTS 3,877,415 4/1975 Blouin ................................. 118/303
4,272,234 6/1981 Tse ................................. 118/303 X
4,686,115 8/1987 Majer ............................. 118/303 X Primary Examiner—Timothy V. Eley
Attorney, Agent, or Firm—Burns, Doane, Swecker & Mathis

[57] ABSTRACT

This granulating device (1) comprises a drum (2) mounted so as to rotate around a substantially horizontal axis. On its inner periphery, this drum (2) carries lifters (20) intended to entrain and lift granules of a substance which is crystallized over a part of its path and it is associated with an entry channel (7) for fine granules which opens into the vicinity of a first end, which is away from that at which the granules are discharged from the drum. A spraying bar (5) is provided inside the latter for spraying the product to be granulated. According to the invention, a fluidized bed device (3) is arranged inside the drum for cooling the granules which are stirred and lifted in the drum, as they become coated by spraying. This device enables the granules to grow uniformly and to cool and dry efficiently, resulting in the production of granules of a very good quality and controlled particle size.

11 Claims, 3 Drawing Sheets

GRANULATING DEVICE AND PLANT

The present invention relates to granulating devices and plants for the production of granules from a product based on a molten, mixed or dissolved crystallizable substance.

In known technology, there are at present two entirely different basic processes for manufacturing granules from a molten substance, these processes being employed, in particular, in the field of fertilizers and of sulphur.

In a first granulation process known as prilling, the molten substance is sprayed at the top of a tower and the droplets are cooled as they fall in the tower. This process makes it possible to obtain granules of excellent quality but their particle size range is limited to between 2 and 3 mm. These sizes do not always meet the present requirements of the users who wish to have access to granules which are larger in size. In addition, a prilling tower constitutes a costly unit, the installation of which can present problems.

The second process makes use of a rotary drum of a mixer or a pan in which molten salt is sprayed onto small granules which, as a result of coating and cooling, yield granules which are larger in size. These small granules are, in fact, produced partly by the granulator itself after the granules which it produces have been screened, and the relationship of the quantity of granules which are reintroduced into the drum to the quantity of granules which leave is called the recycle ratio, these quantities being expressed in weight.

In this granulation process, as in all the other known processes, cooling means have to be provided to remove the heat of crystallization of the molten salt.

A means of removing this heat and permitting the cooling and consequently the hardening of the granules consists in greatly increasing the recycle ratio in order to increase thereby the quantity of cold material entering the drum. Under these conditions, the recycle ratio can attain values from 2:1 to 5:1, which is a disadvantage in a production unit insofar as it results in a considerable oversizing of the plants on the one hand and, on the other hand, in the consumption of large quantities of energy for processing the material which circulates in a closed loop.

It therefore becomes necessary to absorb excess heat of granulation by using a cold source external to the granulating device.

Thus, U.S. Pat. No. A-4,213,924 describes a granulating device with a rotary drum in which a molten salt is sprayed onto a curtain of granules falling inside the drum and in which cooling of the granules is produced by injecting water into the drum, this water being vaporized as it absorbs the heat which is to be removed.

However, this process is difficult to operate insofar as the cooling by water evaporation demands strict and continuous monitoring of the operating conditions. These conditions, which are determined essentially by the temperature and the relative humidity of air, must be such that the molten salt is not capable of hydration. Such hydration conditions can vary very widely depending on the nature of the salt employed, with the result that the working conditions of the rotary drum are strictly determined by the nature of the salt, which consequently allows no flexibility in use. In addition, the water entering the drum has to be expelled by means of a stream of air, which causes problems during the removal of dust from this moist air. Furthermore, this granulating device requires spraying in the form of very fine droplets and consequently the use of jets with very fine orifices, with a particularly high spraying pressure, of the order of 50 bars, to produce very fine mists. Pressure which is as high as this is very difficult to apply to molten nitrates which could be liable to detonate under these conditions.

To overcome these disadvantages, the invention aims at providing a granulating device of the rotary drum type, which permits efficient cooling of the granules without the introduction of water and with a recycle ratio which is as low as possible, while providing granules of a high quality.

To this end, the subject of the invention is a granulating device for the production of granules from a product based on a molten, mixed or dissolved crystallizable substance, comprising a drum mounted to move in rotation around a substantially horizontal axis, means for allowing a particulate substrate to enter, opening into the interior of the drum in the vicinity of one end of the latter, means for spraying the product to be granulated inside the drum and onto the substrate particles and onto the granules produced by coating the latter with the sprayed product, means for entraining the particulate substrate and the granules over a part of the travel of the drum, means for cooling the granules and for crystallizing the substance sprayed onto the latter, which are arranged inside the drum, and means for discharging the granules outside the drum, opening into the vicinity of the end away from the end into which the said means of allowing entry open, characterised in that the means for cooling and for crystallizing comprise at least one fluidized bed device arranged inside the drum, so that at least some of the substrate and some of the granules which are entrained by the drum fall onto the fluidized bed device and then fall back into the drum, means being provided for removing outside the drum the fluid produced by the fluidized bed device.

According to other characteristics:

Each fluidized bed device can be oriented around an axis which is substantially parallel to the lengthwise axis of the drum.

The granulating device comprises a fluidized bed device sloping upwards in the direction of rotation of the drum.

The fluidized bed device is arranged so that the granules fall in the vicinity of the top end of this fluidized bed device.

A part of the inner periphery of the drum, close to the end of the latter into which the granule outlet means open, is generally smooth, to form a stage for shaping and smoothing the granules.

Another subject of the invention is a granulating plant for the production of granules from a product based on a crystallizable substance, comprising means for feeding a product based on a crystallizable substance, means for discharging granules, means for feeding a particulate substrate, and a granulating device of the rotary drum type equipped with means for spraying the product to be granulated and means for allowing the entry of the particulate substrate, which are connected, respectively, to the corresponding means feeding the plant and equipped with granule outlet means connected to the said means for discharging from this plant, in which plant the granulating device is such as defined above.

The invention will be understood better from the reading of the following description of an embodiment, given solely by way of example and made with reference to the attached drawings, in which.

Figure 4:
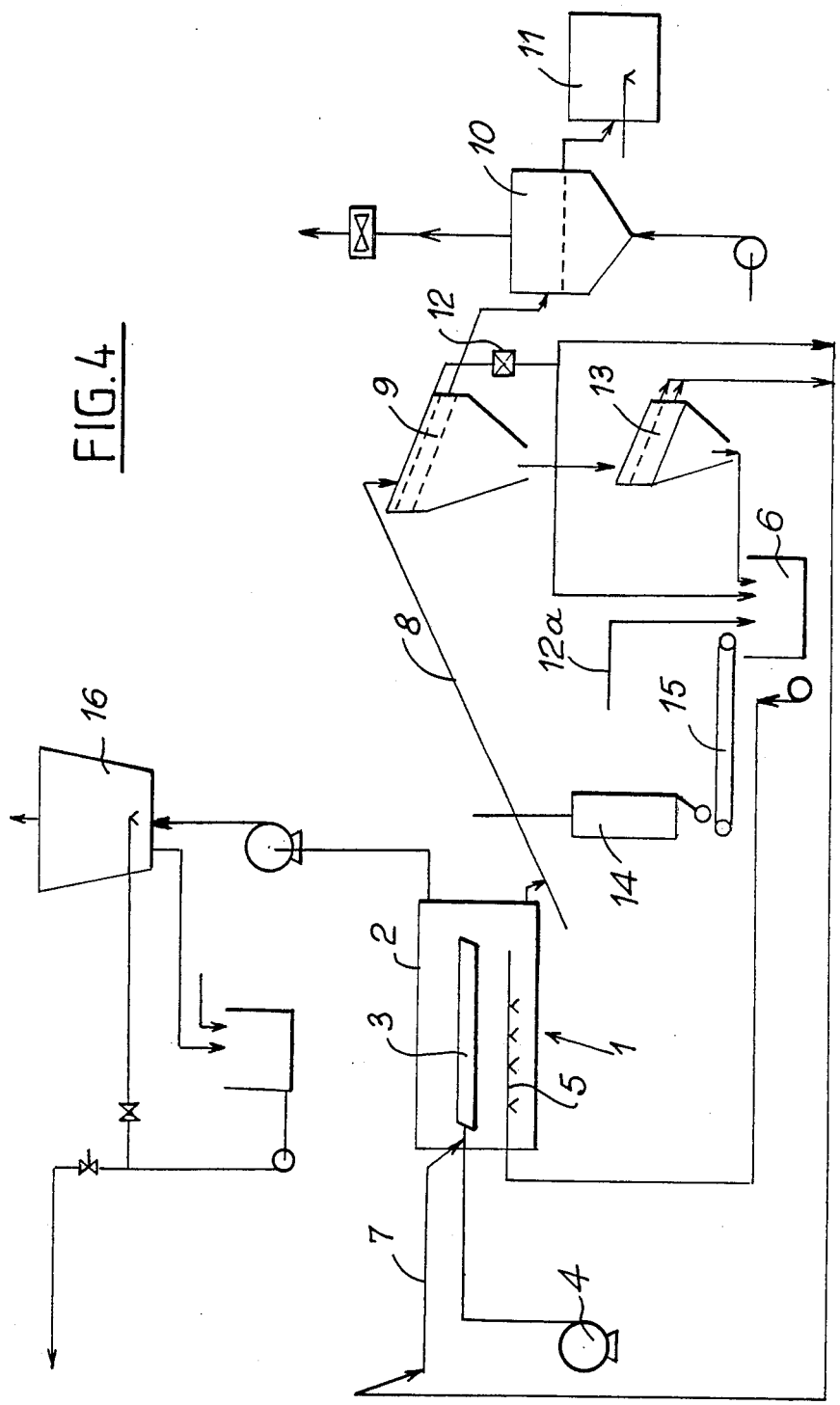
FIG. 4 is a flow sheet of a granulating plant using the granulating device of the invention.

The granulating plant illustrated diagrammatically in FIG. 4 is intended to produce granules, from any sprayable product based on a crystallizable substance, such as, for example, nitrates, especially ammonium nitrate, sulphur, potassium hydroxide, sodium hydroxide or urea, or mixtures of such or other substances with water, particularly an aqueous slurry of ammonium phosphate or a mixture produced by nitric digestion of phosphates.

This plant comprises a granulating device 1 of the type having a rotary drum 2 arranged substantially horizontally, inside which there is a fluidized bed device 3, connected to an air blower 4 outside the drum. A bar 5 for spraying a hot product to be granulated extends inside the drum and into the lower part of the latter under the fluidized bed device 3, this bar being connected, outside the drum, to a homogenizing tank 6, intended to feed the product to be sprayed to this bar 5.

In addition, the granulating device is connected upstream to a channel 7 for feeding small granules of a diameter, for example, of between 800 microns and 3 mm, these granules being intended to serve as a substrate for the formation of larger granules by coating with the crystallizable substance sprayed with the product. This channel 7 ends inside the drum in the vicinity of a first end and, at the opposite end, granule outlet means are provided, these means cooperating with a discharge conveyor 8 which carries the granules to the downstream section of the plant.

The conveyor 8 is adapted to discharge the granules onto a first screening device 9 which separates the granules of a marketable size, for example from 3 to 5 mm, from other granules of a larger or smaller size. Granules of marketable size are conveyed to a fluidized bed device 10 intended to complete the cooling of the granules before the latter are coated with a layer of a substance such as amines, carbonates, talc and the like, in a coater 11, this coating layer being intended to prevent agglomeration of the granules when they are stored.

The granules rejected as oversize at the first screening device 9 are ground (in 12) and:

(a) are poured into the homogenizing tank 6, where they are converted, by melting, into a sprayable product. This tank is additionally fed with fresh product to be sprayed, via a channel 12a;

(b) are recycled directly to the drum 2.

The granules rejected as undersize at the first screening device 9 are reprocessed at a second screening device 13 where the undersize granules, of a size below 800 microns to 1 mm, for example, are poured into the homogenizer tank 6 to be converted into a sprayable product therein. The granules which do not pass through the second screening device 13, that is to say those of a size between approximately 800 microns and 3 mm, are conveyed to the drum 2 by means of a channel 7.

A hopper 14 is also provided for introducing fillers into the homogenizer tank 6 by means of a belt conveyor 15 and a metering device. The purpose of these fillers may be, for example, to reduce the percentage of nitrogen in the granules in the case where the salt processed is a nitrate.

At the end of the drum 2 away from that at which the fluidized bed device 3 is fed with air, the air leaving this device is discharged into a washing tower 16 in which a dilute solution of the crystallizable substance employed in this device is circulated. This solution is subsequently reconcentrated in a unit provided for this purpose before being poured into a homogenizer tank or is recycled directly to the latter.

Figure 1:
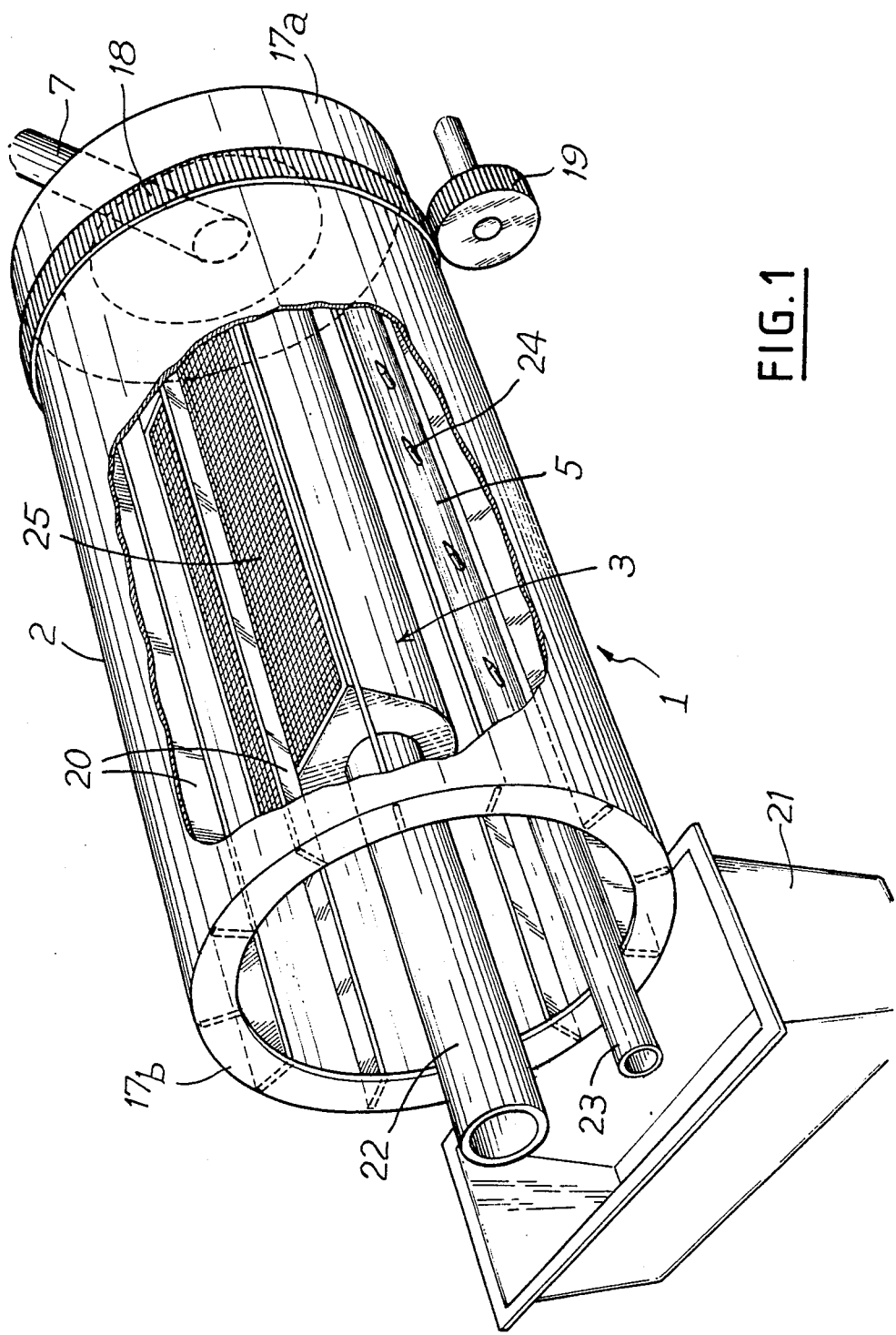
FIG. 1 is a perspective view, with cutaway, of an embodiment of the granulating device of the invention.
Figure 2:
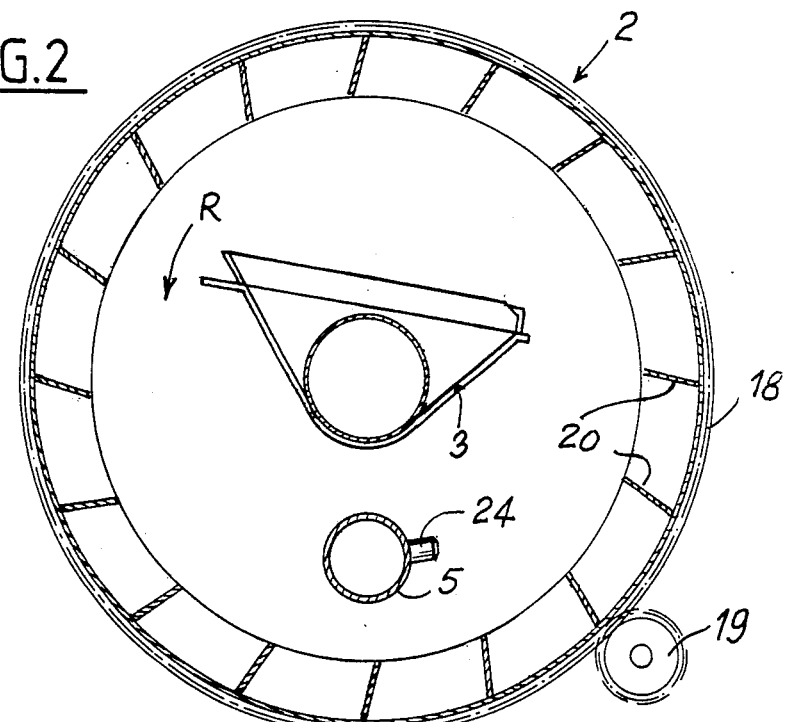
FIG. 2 is a view in cross-section, on a larger scale, along the line 2—2 of FIG. 1.

The granulating device 1 will now be described in greater detail with reference to FIGS. 1 and 2. At each of its ends, the drum 2, arranged substantially horizontally, comprises an annular rim 17a, 17b directed radially inwards to partly close each of its faces. It is supported on its outer periphery by conventional means, which are not shown, and is driven in the direction of arrow R, for example by a crown gear 18 meshing with a pinion 19 connected to a motor which is not shown. The motor is preferably associated with a speed controller enabling the speed of rotation of the drum to be regulated at an optimum value which is between 35 and approximately 45% of the critical speed, that is to say the speed above which the centrifugal force causes the granules to adhere to the drum wall.

To entrain the granules and to lift them over a part of the travel of the drum 2, the latter is fitted with suitably oriented, lengthwise lifters 20.

The fine granule feed channel 7 opens into the interior of the drum 2 in the vicinity of a first end of the latter, passing through the opening formed by the corresponding annular rim 17a.

At the opposite end, a hopper 21 is provided under the drum to receive the granules which spill from the latter over the corresponding annular rim 17b, this hopper 21 subsequently discharging the granules onto the conveyor 8.

A duct 22 for feeding air into the fluidized bed device 3, connected to the blower 4, and a feed duct 23 connecting the tank 6 to the spraying bar 5 which is fitted with nozzles 24, pass through the end opening of the drum in the vicinity of the hopper 21. The duct 23 is preferably of the jacketed type to enable the product to be kept up to temperature by steam circulating under pressure.

The fluidized bed device 3 extends lengthwise inside the drum and substantially in the centre of the latter so that its grid 25 is preferably sloping slightly upwards in the direction of rotation R of the drum. The slope angle can be varied and may be, for example, of the order of 5° to the horizontal, so that the granules lifted by the lifters 20 fall back in the vicinity of the top end of the fluidization grid 25, and then, after staying above the grid 25 for a short time, fall back into the drum. To enable the slope of this fluidized bed device to be regulated, the latter is advantageously mounted to be capable of oscillating about an axis which is substantially parallel to the lengthwise axis of the drum.

In the case where the device described above operates with a molten salt, especially a nitrate, the granules 20 introduced via the channel 7 into the rotating drum are subjected to a number of cycles of coating and cooling with air to a temperature close to ambient temperature, before leaving the drum, this cycle being capable of being analysed as follows.

The nozzles 24 apply a coating of molten salt to the granules falling from the device 3. These granules are then entrained by the lifters 20 over the grid 25 onto which they fall to be cooled efficiently, while the salt film deposited by spraying crystallizes, before falling back to the bottom of the drum and restarting a new cycle of granule growth due to coating and crystallization. The granules gradually move in the drum in the direction of the outlet end from which they spill over the annular rim 17a and fall into the hopper 21.

By virtue of this device, the particle size range of the granules produced may be changed at will by modifying one or more of the following parameters:

The slope of the fluidization grid of the fluidized bed device, to modify the residence time of the granules on this grid;

The flow rate of the cooling air through the fluidized bed grid, to obtain accurate control of the granule bed temperature The recycle ratio and the rate of spraying of the crystallizable substance, to modify the available quantity of substance per granule, that is to say the thickness of each successive coating layer; and the slope of the fins 20 and the speed of rotation of the drum, to modify the granule mixing regime and the frequency with which the granules are coated and cooled.

In the case where a slurry is used, for example an aqueous slurry of ammonium phosphate which is sprayed hot, the operation of the granulating device is similar to that described above, apart from the fact that the air injected through the fluidized bed device is preheated to a temperature such that it dries the granules by causing the crystallization of the ammonium phosphate sprayed onto these granules and that it vaporizes virtually all the water present in the slurry which is sprayed.

An example of operating conditions for the operation of the granulation device using ammonium nitrate is given below.

| | |
|---|---|
| Concentration of the crystallizable substance in the product sprayed (a) | 97 to 99.5% |
| Temperature of the sprayed product | 170 to 190° C. |
| Recycle ratio (b) | 0.8:1 to 1:1 |
| Recycle temperature | 60 to 70° C. |
| Granulator outlet temperature | 95 to 105° C. |
| Speed of rotation of the granulator | 35 to 45% of Vc* |
| Cooling air flow | 1 to 3 l/kg of sprayed product |

*Vc = critical speed of rotation of the drum
(a) = the impurity being chiefly water
(b) = recycled granule fraction relative to the leaving product fraction.

An arrangement of this kind makes it possible to obtain granules of very high quality by virtue of the homogeneous and efficient cooling thereof, which is carried out layer by layer as they are being coated with the sprayed substance. In each growth cycle of the granule, the quantity of material to be cooled on the latter is restricted to a thin film which is cooled very efficiently by the stream of air leaving the fluidized bed device.

Furthermore, the use of a fluidized bed device allows the sprayed substance to be dried efficiently, thus making the presence of a drier downstream of the granulating device no longer necessary. This major advantage in the case of a molten salt which usually contains from 1 to 2% of water, is found to be remarkable when use is made of a slurry the water in which is virtually completely vaporized by the hot air leaving the fluidized bed device.

Granulation efficiency no longer requires, in contrast to the prior art, spraying in the form of very fine droplets and, consequently, product pressure upstream of the jets is of the order of a few bars. This results in a saving in the plant and running costs.

Furthermore, owing to the efficiency of the cooling means chosen, the throughput of air supplied to the fluidized bed device is relatively low compared to the traditional methods, which enables the granulating device to be reduced in overall size. The efficient cooling also makes it possible to use air at ambient temperature when a molten crystallizable substance is used. An advantage of this kind avoids the need for special conditioning of air for the cooling thereof, making the process more economical.

The low value of the recycle ratio enables the operating costs of the device of the invention to be decreased by reducing to the minimum the energy employed for processing the material circulating in a closed circuit in the plant. In addition, the granulating device provides a high degree of safety and a great operating flexibility, since it employs neither water nor steam and permits the particle size characteristics to be chosen by modifying one or more of the abovementioned parameters.

The granules obtained are very robust, particularly because of their layered structure, and are substantially spherical in shape and have a substantially smooth surface. These granules can therefore be stored in sacks at temperatures of the order of 45° to 50°C. without requiring the addition of hardening or coating adjuvants, which allows normal air to be used for cooling them, even in hot climates.

According to yet another advantage, the granules have very low porosity and, in this respect, meet the safety recommendations in the case of nitrates.

Figure 3:
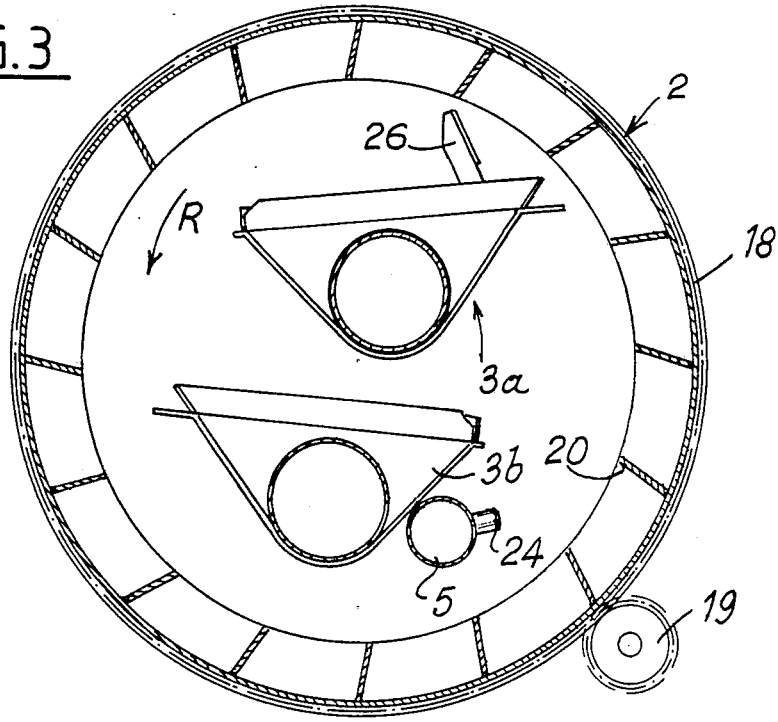
FIG. 3 is a view similar to that of FIG. 2, illustrating an alternative embodiment of the device of FIG. 1.

Many other alternative forms may be envisaged, of course, without departing from the scope of the invention. Thus, according to a first alternative embodiment illustrated in FIG. 3, the granulating device is equipped with two fluidized bed devices 3 arranged one above the other. The upper device 3a slopes downwards in the direction of rotation R of the drum and the lower device 3b slopes at substantially the same angle in the opposite direction. Moreover, in order to ensure that the granules which fall on the upper fluidized bed device may have a sufficiently long residence time, account being taken of the slope of this device, the latter is preferably equipped with a baffle 26. The lower fluidized bed device is arranged so that the granules falling from the upper fluidized bed device fall in the vicinity of its high end, to ensure thereby a maximum residence time of the granules on the corresponding fluidization grid before they fall to the bottom of the drum to be coated therein with the sprayed product, as described earlier. When the use of more than two fluidized bed devices is envisaged, these will be arranged so that two neighbouring fluidized bed devices will slope in mutually opposite directions, so that the granules fall in cascade fashion alternately on the different devices provided.

Means may be provided for preventing accumulation of the product on the inner wall of the drum.

The drum may also include, on its inner periphery in the vicinity of its outlet end, a substantially smooth annular portion intended to enable the granules to roll over each other and over this substantially smooth part of the wall, in order to produce granules of a substantially spherical and uniform shape.

Several spraying bars may be provided in the drum and the means for lifting the granules in the drum can assume any suitable shape other than fins.

What is claimed is:

1. A granulating device for the manufacture of granules from a product, comprising a drum mounted for rotational movement around a substantially horizontal axis, means for allowing a particulate substrate to enter the drum, opening into the interior of the drum adjacent to a first end of the drum, means positioned inside the drum for spraying the product to be granulated onto the substrate particles and onto the granules being formed, means for entraining the particulate substrate and the granules over a part of the travel of the drum, means positioned inside the drum for cooling the granules, and means for removing the granules from the drum, the means for removing opening adjacent to a second end of the drum remote from the first end thereof; wherein the means for cooling includes at least one fluidized bed device which discharges a fluid into the drum and which is arranged inside the drum so that, when the drum rotates, at least some of the substrate and some of the granules entrained by the drum fall on the at least one fluidized bed and then fall back again into the drum, and means communicating with the drum for removing the fluid leaving the at least one fluidized bed device.

2. The device as claimed in claim 1, wherein the at least one fluidized bed device can be oriented around an axis which is substantially parallel to the lengthwise axis of the drum.

3. The device as claimed in claim 1, wherein the drum is operable to carry particles to an upwardly sloping transverse surface of the at least one fluidized bed device viewed in the direction of movement of the top of the drum.

4. The device as claimed in claim 3, wherein the surface of the at least one fluidized bed device has an elevated side and slopes so that the granules fall in the vicinity of the elevated side.

5. The device as claimed in claim 1, comprising at least two fluidized bed devices spaced vertically and offset sideways, surfaces of the at least two adjacent fluidized bed devices preferably sloping in opposite directions so that granules fall in cascade fashion from one fluidized bed device to the other.

6. The device as claimed in claim 5, wherein a baffle arranged above the upper fluidized bed device slopes in the direction of the upstream part of the drum.

7. The device as claimed in claim 1, wherein the drum includes a substantially smooth annular section of the inner periphery of the drum wall, close to the second end of the drum, so that the granules may roll over each other and over the corresponding section of the drum wall to produce granules having a substantially smooth surface and a substantially spherical shape.

8. The device as claimed in claim 1, wherein the means for spraying are situated in the lower part of the drum under the at least one fluidized bed device.

9. The device as claimed in claim 1, wherein the at least one fluidized bed device is supplied with hot air.

10. The device as claimed in claim 1 wherein the means for cooling the granules also comprises a means for crystallizing the product sprayed onto the granules.

11. A granulating plant for the manufacture of granules from a product based on a crystallizable substance, comprising:
means for feeding a product based on a crystallizable substance;
means for discharging granules;
means for feeding a particulate substrate;
a granulating device including
a drum mounted for rotational movement around a substantially horizontal axis,
means for allowing a particulate substrate to enter the drum, opening into the interior of the drum adjacent to a first end of the drum, being connected to the means for feeding a particulate substrate,
means positioned inside the drum for spraying the product to be granulated onto the substrate particles and onto the granules being formed, being connected to the means for feeding a product,
means for entraining the particulate substrate and the granules over a part of the travel of the drum,
means positioned inside the drum for cooling the granules, and
means for removing the granules from the drum, opening adjacent to a second end of the drum remote from the first end thereof, being connected to the means for discharging granules,
wherein the means for cooling includes at least one fluidized bed device which discharges a fluid into the drum and which is arranged inside the drum so that, when the drum rotates, at least some of the substrate and some of the granules entrained by the drum fall on the at least one fluidized bed and then fall back again into the drum, and
means communicating with the drum for removing the fluid leaving the at least one fluidized bed device.

* * * * *